(12) United States Patent
Aratani et al.

(10) Patent No.: US 7,417,816 B2
(45) Date of Patent: Aug. 26, 2008

(54) SURFACE ANALYSIS TEST WITH MIXED ECC SYMBOL

(75) Inventors: Masanori Aratani, Kanagawa (JP); Yasuhiro Iihara, Kanagawa (JP); Masaki Kudoh, Tokyo (JP); Junzoh Noda, Kanagawa (JP); Masahiro Shimizu, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 499 days.

(21) Appl. No.: 11/179,205

(22) Filed: Jul. 11, 2005

(65) Prior Publication Data

US 2006/0012906 A1    Jan. 19, 2006

(30) Foreign Application Priority Data

Jul. 16, 2004    (JP) ............................. 2004-209507

(51) Int. Cl.
*G11B 5/09* (2006.01)
(52) U.S. Cl. ........................................................ 360/53
(58) Field of Classification Search ........................ None
See application file for complete search history.

(56) References Cited

U.S. PATENT DOCUMENTS 6,651,213 B2    11/2003    Hassner et al.
6,747,827 B1 *  6/2004    Bassett et al. ................. 360/53

FOREIGN PATENT DOCUMENTS

| JP | 09-145634 | 6/1997 |
|----|-----------|--------|
| JP | 2001-351228 | 12/2001 |

* cited by examiner

*Primary Examiner*—Joseph Feild
*Assistant Examiner*—Daniell L Negrón
(74) *Attorney, Agent, or Firm*—Townsend and Townsend and Crew LLP (57) ABSTRACT

Embodiments of the present invention provide an inspection method for detecting a physical defect of a magnetic disk with high sensitivity without increasing the length of inspection time. In a magnetic disk drive according to one embodiment, the assembling of which has been completed, by reading inspection data written to a magnetic disk, a defect of the magnetic disk is detected in a state in which a read error occurs. Redundant bits of an ECC are added to the inspection data. If a head corresponding to a recording surface to be inspected has superior read performance, an ECC 2 is applied. If the head in question has inferior read performance, an ECC 4 is applied. Accordingly, as compared with a case where a single ECC is applied, the defect detectivity is further improved without increasing the length of inspection time.

10 Claims, 4 Drawing Sheets

SURFACE ANALYSIS TEST WITH MIXED ECC SYMBOL

CROSS-REFERENCES TO RELATED APPLICATIONS

This application claims priority from Japanese Patent Application No. JP2004-209507, filed Jul. 16, 2004, the entire disclosure of which is incorporated herein by reference.

BACKGROUND OF THE INVENTION

The present invention relates to an inspection method for inspecting a magnetic disk placed in a magnetic disk drive, and more particularly to an inspection method for detecting a physical defect occurring on a magnetic layer of a magnetic disk with high sensitivity without increasing the length of inspection time.

A magnetic disk used for a magnetic disk drive is produced by laminating a magnetic layer on a glass substrate using the thin-film formation technology such as sputtering. Because the glass substrate itself has some unevenness on its surface, or because conditions in a sputtering process sometimes change, a defect specific to a recording medium may occur on a surface of the magnetic layer. The magnetic disk drive has an error correction code (hereinafter referred to as ECC) by which if a bit pattern of data which has been read from the magnetic disk is abnormal, this abnormal condition is detected to correct the read data. Therefore, even if the magnetic disk includes a minute defect, if the number of error bits included in the data to be corrected by the ECC is within a range of the error-correction capability of the ECC, practically no problem is produced.

However, if such a minute defect is left unhandled, the size of the physical defect increases, and consequently there arises a possibility that the number of error bits will increase. In particular, if the magnetic disk is exposed under high-temperature environment for a long time, the defective area further expands. Therefore, in the manufacturing stage of the magnetic disk drive, it is desirable to detect even a minute defect with high sensitivity, and to handle the defect in advance so that the defective part is not used. On the other hand, because it takes a long time to detect a defect, if a magnetic disk drive is produced by means of mass production, pursuing only the improvement in the defect detectivity is not allowed from a viewpoint of the quantity of production or yields. In addition, it is necessary to consider use efficiency of test equipment prepared by a large investment.

A Patent Document 1 (Japanese Patent Laid-Open No. Hei 9-145634) discloses a technology relating to defect detection of an optical recording medium, which enables the defect detection in which the error correction capability of an actually used read/write device is taken into consideration, and which can improve yields at the time of manufacturing disks. Moreover, a Patent Document 2 (Japanese Patent Laid-Open No. 2001-351228) discloses a surface defect test method for testing a magnetic disk medium in which even if there is dispersion in read core widths of an inspection head, there is no dispersion in the sensitivity to a defect on the medium. Further, a Patent Document 3 (U.S. Pat. No. 6,651,213) discloses a technology for determining the redundancy of an ECC in response to the probability distribution of errors for each zone, which is obtained in a manufacturing test stage.

BRIEF SUMMARY OF THE INVENTION

As a method for detecting a physical defect of a magnetic disk, there is a method using a read/write test, whereby specified inspection data is first written to a magnetic disk, and the written inspection data is then read to evaluate a defect of the magnetic disk. The magnetic disk drive is so devised that when writing data to a sector of a magnetic disk, redundant bits called an ECC, which is calculated according to a bit array of data, is added to the sector at the same time. Accordingly, at the time of writing or reading, even if an inversion error occurs in some bits among bit strings of data included in the sector, it is possible to recover the correct write data.

Therefore, even if a usual read/write test is performed using inspection data, a defect cannot be detected with the exception of a case where there is a large defect that exceeds the error correction capability of the ECC. The error correction capability of the ECC is determined by the number of redundant bits of the ECC used for corresponding data bits. With the increase in redundancy of the ECC, the error correction capability increases, and consequently the number of inverted bits or the number of error bits, which can be corrected, increases. The error correction capability of the ECC is evaluated by the number of symbols. In general, eight bits form one symbol. If the number of symbols is larger, it is possible to recover correct data even if an inversion error occurs in a larger number of bits.

When users use a magnetic disk drive, for example, an ECC, the number of symbols of which is 20 or more for each sector having a length of 512 bytes, is used. In a read/write test that is performed to detect a defect of a magnetic disk, there is a method that uses an ECC, the number of symbols of which is small, for example, 4 symbols or 6 symbols. In recent years, as a result of the improvement in the track density and the bit density, the defect inspection sometimes fails to detect a minute defect that was not problematic before. Therefore, there is an increasing possibility that such a defect will cause a failure of a product after shipment. Furthermore, in the case of a magnetic disk drive that is produced by means of mass production, the length of time which can be spent in the defect inspection of a magnetic disk is limited.

A feature of the present invention is to provide an inspection method for detecting a physical defect of a magnetic disk with high sensitivity without increasing the length of inspection time. Another feature of the present invention is to provide an inspection method whereby a physical defect of a magnetic disk is detected with high sensitivity without increasing the length of inspection time by selecting the number of ECC symbols in response to the read performance of a head.

In order to inspect a defect of a magnetic disk, in what is called a read/write test performed by evaluating read characteristics of a head that reads written inspection data, paying attention to the point that heads used for reading include a head having superior read performance and a head having inferior read performance, the detectivity of detecting a minute defect is improved without increasing the length of inspection time. In addition, another point to which attention is paid is that at the time of reading inspection data, a read error may occur due to accidental causes other than defects of a magnetic disk, which becomes a factor of the increase in the length of inspection time.

According to an aspect of the present invention, the read performance of a head corresponding to a recording surface of a magnetic disk to be inspected is first evaluated. Then, in the case of a head having superior read performance, inspection data is read by use of an ECC, and the number of symbols is small. On the other hand, in the case of a head having inferior read performance, inspection data is read by use of an ECC, and the number of symbols is large. In such a configuration, in the case of a head having superior read performance, using an ECC, the error correction capability of which is low, makes it possible to improve the detectivity of detecting a minute defect that causes an error, and the number of error bits is small.

In the case of a head having inferior read performance, by using an ECC, the error correction capability of which is high, makes it possible to correct an error that occurs due to accidental causes other than defects of a magnetic disk, and thereby to prevent the length of inspection time from increasing. As compared with a case where both a head having superior performance and a head having inferior performance read inspection data by use of a single ECC, more specifically, there is no difference in the number of ECC symbols between the heads, and further improvement in detectivity can be achieved while keeping the length of inspection time or yields within a specified range.

Thus, if one magnetic disk drive has a plurality of heads, and if those heads include a head having superior read performance and a head having inferior read performance, it is possible to achieve, on a magnetic disk basis, both the improvement in the defect detectivity and ensured yields. Further, when inspecting a plurality of magnetic disk drives that are produced by means of mass production, it is possible to achieve, for the magnetic disk drives as a whole, both the improvement in the defect detectivity and ensured yields.

According to a first aspect of the present invention, there is provided an inspection method for inspecting a defect of a magnetic disk in a magnetic disk drive comprising the magnetic disk and a head. The inspection method comprises classifying the head as either a first group of heads having superior read performance or a second group of heads having read performance inferior to that of the head in the first group; associating a head classified as the first group with a first error correction code having the first number of symbols, and associating a head classified as the second group with a second error correction code having the second number of symbols that is larger than the first number of symbols; writing to the magnetic disk, by the head, inspection data, and a third error correction code used to correct an error of the inspection data, the third error correction code having the specified number of symbols that is larger than the second number of symbols; if the head is classified as the first group, reading the inspection data by use of the first number of symbols that is part of the specified number of symbols of the third error correction code; and detecting a read error of the inspection data.

According to a second aspect of the present invention, there is provided an inspection method for inspecting a defect of a magnetic disk in a magnetic disk drive comprising the magnetic disk and a head. The inspection method comprises classifying the head as either a first group of heads having superior read performance or a second group of heads having read performance inferior to that of the head in the first group; associating a head classified as the first group with a first error correction code having the first number of symbols, and associating a head classified as the second group with a second error correction code having the second number of symbols that is larger than the first number of symbols; if the head is classified as the first group, writing to the magnetic disk, by the head, inspection data, and the first error correction code used to correct an error of the inspection data; reading, by the head, the inspection data by use of the first error correction code; and detecting a read error of the inspection data.

According to a third aspect of the present invention, there is provided an inspection method for inspecting a defect of a magnetic disk in a magnetic disk drive comprising the magnetic disk and a head. The inspection method comprises providing the head with a read parameter; for a head having the read parameter, a value of which is better than a specified threshold value, performing a read/write test by use of a first error correction code having the first number of symbols; and for a head having the read parameter, a value of which is worse than the specified threshold value, performing the read/write test by use of a second error correction code having the second number of symbols that is larger than the first number of symbols.

The present invention could provide the inspection method for detecting a physical defect of a magnetic disk with high sensitivity without increasing the length of inspection time. Furthermore, the present invention could also provide the inspection method whereby a physical defect of a magnetic disk is detected with high sensitivity without increasing the length of inspection time by selecting the number of ECC symbols in response to the read performance of a head.

BRIEF DESCRIPTION OF THE DRAWINGS

FIGS. 2 (A) and (B) are diagrams each illustrating a format of a magnetic disk shown in FIG. 1;

DETAILED DESCRIPTION OF THE INVENTION

Figure 1:
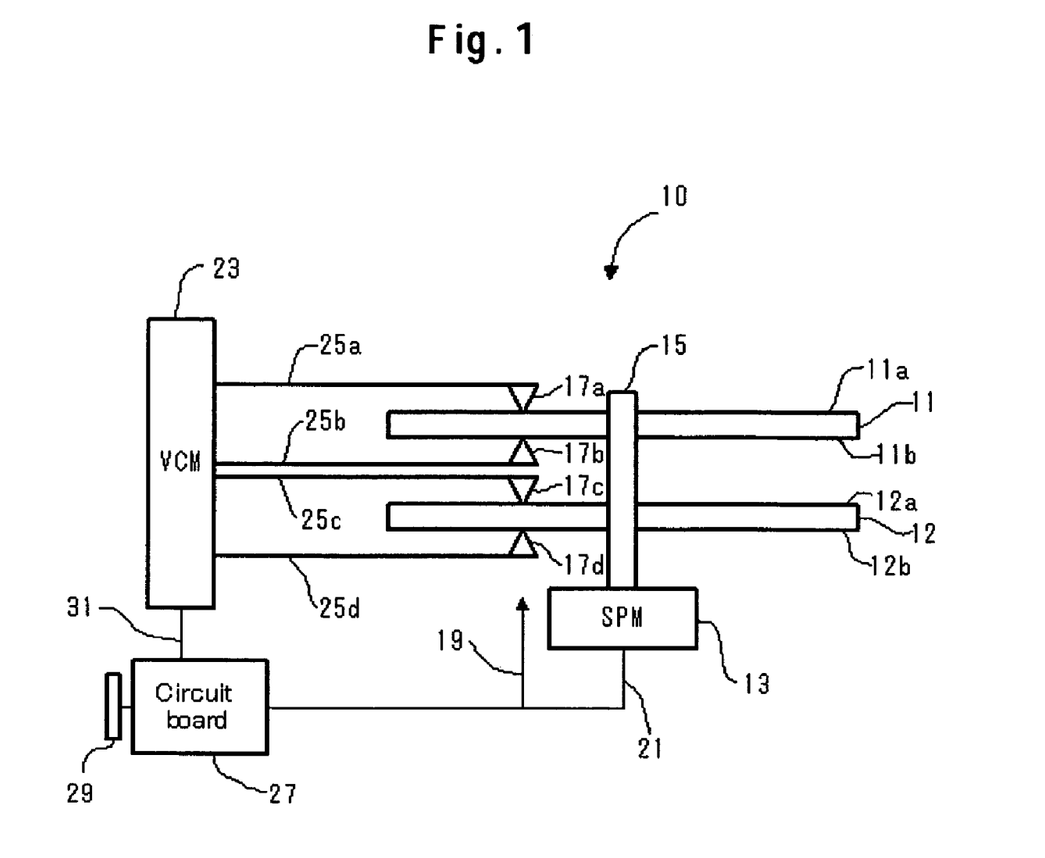
FIG. 1 is a configuration diagram schematically illustrating a magnetic disk drive used for the defect inspection according to one embodiment of the invention.

Specific embodiments of the present invention will be described with reference to drawings as below. FIG. 1 is a configuration diagram schematically illustrating a magnetic disk drive relating to a defect inspection method of this embodiment. A magnetic disk drive 10 comprises two magnetic disks 11, 12. The magnetic disk 11 has recording surfaces 11a, 11b; and the magnetic disk 12 has recording surfaces 12a, 12b. The magnetic disks 11, 12 are secured to a spindle shaft 15 at a specified interval. A spindle motor 13 (hereinafter referred to as SPM) rotates as one unit the spindle shaft 15 and the magnetic disks 11, 12.

The present invention does not limit the number of magnetic disks or the number of recording surfaces. The magnetic disk drive 10 is provided with heads 17a, 17b, 17c, 17d that correspond to the recording surfaces 11a, 11b, 12a, 12b of the magnetic disks 11, 12 respectively. Each head is formed on a slider, and is formed as a composite head including an induction type head for writing and a MR head for reading. However, the present invention can be applied to a magnetic disk drive that uses a combination head shared both writing and reading.

The sliders on which the heads 17a, 17b, 17c, 17d are formed are mounted to suspension assemblies 25a, 25b, 25c, 25d respectively. The suspension assemblies 25a, 25b, 25c, 25d are driven by a voice coil motor 23 (hereinafter referred to as VCM) so that they are pivotally moved as one unit. As a result, each head is positioned at a desired track that is defined on a corresponding recording surface of a magnetic disk.

The magnetic disk drive 10 further comprises a circuit board 27 having an on-board semiconductor device that is used to totally control the operation of the magnetic disk drive 10, and to control data communications with outside. The circuit board 27 includes a MPU, a RAM, a ROM, an EEPROM, and a read/write channel. The heads 17a, 17b, 17c, 17d, a SPM 13, and a VCM 23 are connected to the circuit board 27 through lines 19, 21, 31. Moreover, an interface connector 29 used to make connections with outside is connected to the circuit board 27.

Figure 2:
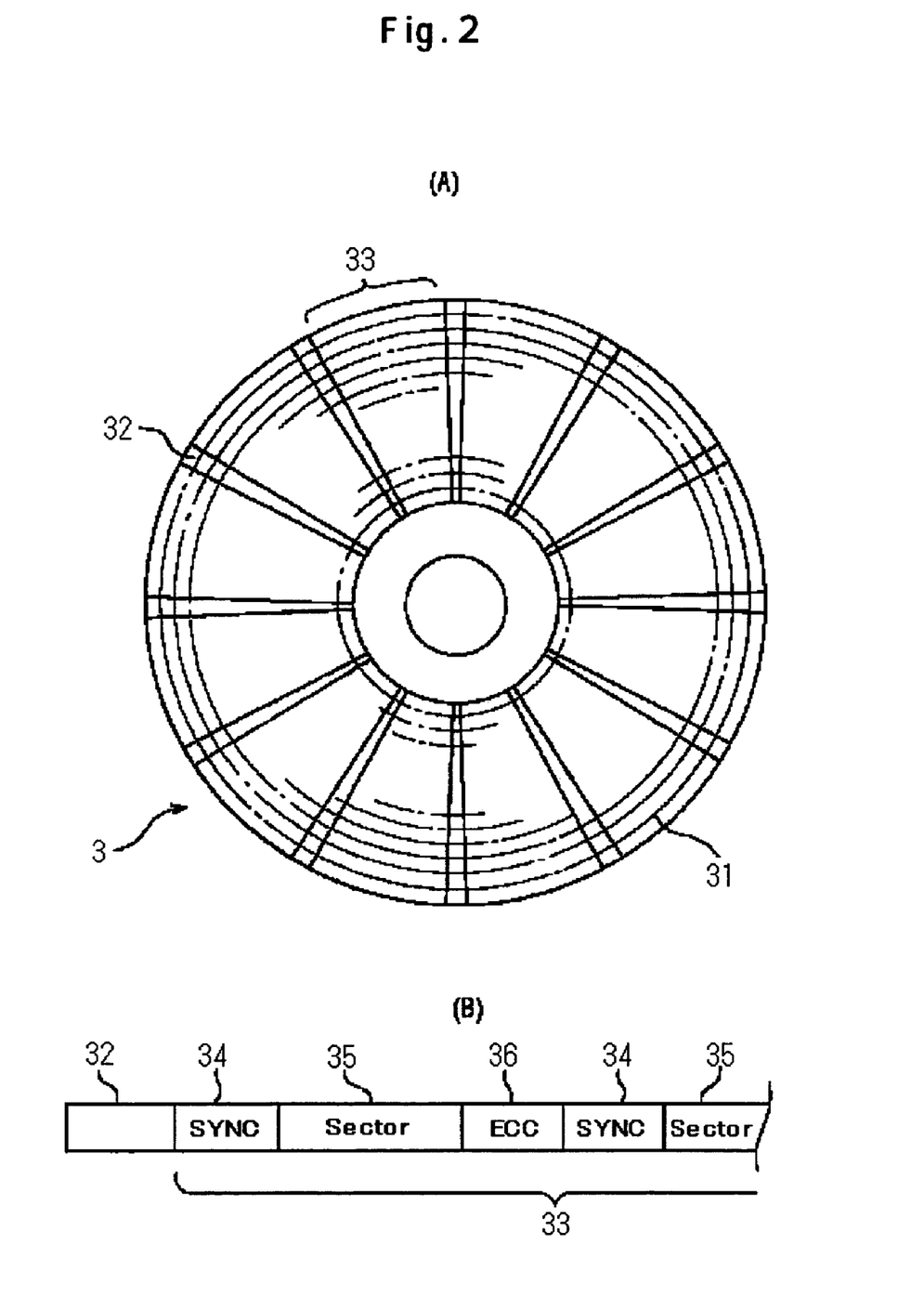

FIGS. 2(A) and 2(B) are diagrams each illustrating a format that is used for recording surfaces 11a, 11b of the magnetic disk 11 and recording surfaces 12a, 12b of the magnetic disk 12. As shown in FIG. 2(A), a plurality of tracks 31 are concentrically defined on the four recording surfaces of the magnetic disks 11, 12. In addition, a plurality of servo data 32 is radially written. As shown in FIG. 2(B), each track is provided with a data area 33 in a manner that the data area 33 is adjacent to the servo data 32 in the circumferential direction. The data area 33 includes a SYNC pattern 34 that is used when the read/write channel adjusts a gain and achieves synchronization; a sector 35 having a length of 512 bytes, which is a data write area and is a unit of read/write; and an ECC area 36 to which an ECC is written, the ECC being used to correct a read error of data written to a sector. The SYNC pattern 34, the sector 35, and the ECC area 36 are used as a set, and a plurality of sets are formed in the data area 33 in the same manner. Incidentally, the ECC area 36 includes a sector address of its corresponding sector.

Figure 3:
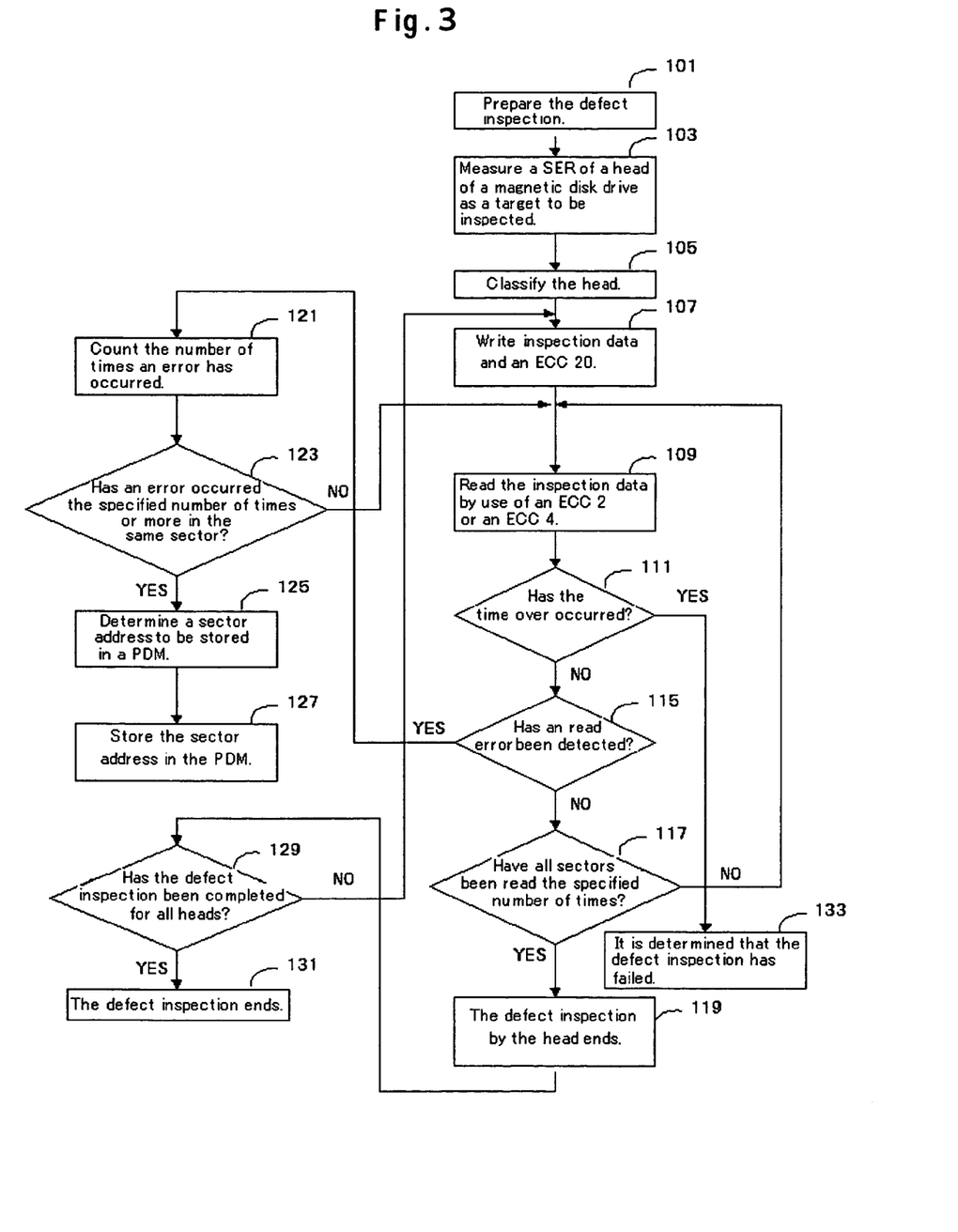
FIG. 3 is a flowchart illustrating one mode of an inspection method according to this embodiment.

When producing the magnetic disk drive 10 having such a configuration, the following is performed in an inspection process after completing the assembly; adjusting and checking various kinds of parameters relating to a head, an amplifier, and the like; performing a read/write test under high temperature conditions to perform the defect inspection of a surface of a magnetic disk; performing the defect analysis of a magnetic disk and storing a detected defect; and finally adjusting functions of the magnetic disk drive. The inspection method for detecting a defect of a magnetic disk described in this embodiment can be implemented as part of the above-mentioned inspection process. What will be described with reference to a flowchart shown in FIG. 3 is an inspection method for detecting a physical defect that occurs on each recording surface of the magnetic disks 11, 12 included in the magnetic disk drive 10.

To begin with, in a block 101, a read parameter is selected, and then its threshold value is set. The read parameter is used to classify heads into two groups: a head having superior read performance; and a head having inferior read performance. In this embodiment, a soft error rate (hereinafter referred to as SER) is adopted as a read parameter. The SER is a value that is measured for the performance evaluation of a head even in the usual inspection process. The SER is a parameter that is measured for each pair of a head and a recording surface of a magnetic disk. The SER is a common logarithm of a value obtained by dividing the number of sectors, in which an error has been detected as a result of performing a read/write test, by the total number of bits that have been read.

Usually, the SER is measured by counting, on a sector basis, errors occurring when writing and reading inspection data by use of an ECC, the number of symbols of which is 0 (hereinafter an ECC, the number of symbols of which is (N), is expressed as an ECC (N)), or by use of an ECC 4. The SER is a value specific to a head, and is a value in which several conditions of a manufacturing process for a head are reflected. A head having a large SER is inferior in read performance. Accordingly, if the head reads data in the same magnetized state from the same magnetic disk, there is a higher probability that a read error will be detected. How to set a threshold value will be described later.

Next, SERs of the heads 17a, 17b, 17c, 17d of the magnetic disk drive 10, which are targets to be inspected, are measured in a block 103. The SERs are measured by performing read/write tests of the magnetic-disk recording surfaces 11a, 11 b, 12a, 12b, each of which corresponds to each head of the magnetic disk drive 10. How to measure the SERs includes the following steps: first writing inspection data to the whole sector, or to some sectors, of each recording surface; and by reading the written inspection data, calculating the number of sectors in which an error has occurred, and the total number of read bits.

In a block 105, as a result of measuring the SER of each of the heads 17a, 17b, 17c, 17d, if the SER is better than a predetermined SER threshold value, the head is classified as a first group, that is to say, a group of heads having superior read performance. On the other hand, if the SER is worse than the SER threshold value, the head is classified as a second group, that is to say, a group of heads having inferior read performance. Moreover, the head classified as the first group is associated with an ECC 2; and the head classified as the second group is associated with an ECC 4.

In a block 107, a recording surface to be inspected first is selected. Next, if among the heads 17a, 17b, 17c, 17d a head corresponding to a recording surface to be inspected is classified as the first group, by use of this head, inspection data configured with an inspection bit pattern is written to the whole sector 35 of a corresponding recording surface of the magnetic disk 11 or 12. Then, an ECC 20 which is a redundant bit used to correct the inspection data is written to the ECC area 36.

The ECC 20 is an error correction code provided when the magnetic disk drive 10 is shipped to a user. The bit pattern of the ECC 20 is calculated by the well-known technology in response to a bit pattern of the inspection data written to the corresponding sector. When comprehensively determining the bit pattern from both the inspection data and the ECC 20, if the inspection data includes a bit inversion error, the number of bits of which is within a specified range, the inspection data is read as correct data. Also, if among the heads 17a, 17b, 17c, 17d a head corresponding to a recording surface to be inspected is classified as the second group, by use of this head, the inspection data is written to the whole sector 35 of a corresponding recording surface of the magnetic disk 11 or 12 in like manner. Then, the ECC 20 corresponding to the inspection data is written to the ECC area 36.

Next, in a block 109, if the head corresponding to the recording surface to be inspected is classified as the first group in the block 105, the inspection data is read using only two symbols among 20 symbols of the ECC 20. Making the number of ECC symbols to be used when reading data smaller than the number of ECC symbols used when writing data is well-known technology. Because the number of ECC symbols is reduced from 20 to 2, if a bit string of the inspection data to be read includes a bit where an inversion error has occurred, the number of bits that can be corrected is reduced to a large extent as compared with the number of bits in the case of the ECC 20 used by a user. As a result, there is a higher probability that an error will be detected. This makes it possible to detect even a minute defect, which improves the detectivity.

Possible causes of a read error being detected includes not only a physical defect of a magnetic disk, but also the following accidental causes production conditions of a head; flying conditions of a slider, which changes due to vibrations and a shock; and a noise that is mixed into a signal circuit. Accordingly, making the number of ECC symbols small increases the probability that an error will be detected due to these accidental factors. However, because the head which is classified as the first group has a better SER, even if the number of symbols at the time of reading is made small, a probability of causing an accidental read error other than physical defects of a magnetic disk does not become so high.

Therefore, the time spent in the defect inspection is not extended by an accidental error, and the sensitivity of detecting a minute physical defect of a magnetic disk is improved only by the amount achieved by making the number of ECC symbols small. In particular, in the case of a head having superior read performance, even if a magnetic disk includes a minute defect causing a magnetized state of written data to fluctuate to some extent, using the ECC 4 results in correct reading of data. Therefore, heretofore it was not able to sufficiently detect a defect. However, such inconvenience can be solved in this embodiment. A minute defect may expand under an acceleration condition by temperature while a user uses the magnetic disk. In this case, even a head having a better SER cannot read the magnetic disk. Accordingly, if it is possible to detect a minute defect beforehand, it leads to an improvement in the capability of the magnetic disk drive to ensure the quality.

In addition, in the block 109, if the head corresponding to the recording surface to be inspected is classified as the second group in the block 105, the inspection data is read using only four symbols among 20 symbols of the ECC 20. Also in the case of a head having inferior read performance in the second group, if inspection data is read by use of the ECC 2 to increase the sensitivity of defect detection, accidental read errors other than physical defects of a magnetic disk increase, resulting in much time spent in the defect inspection.

Accordingly, the defect inspection which uses the head classified as the second group is performed using the ECC 4, and a higher priority is given to the inspection time or ensuring of yields. However, as for the head having a worse SER, if a minute defect occurring on a magnetic disk causes a magnetized state of written data to fluctuate, a probability that an error will occur is higher than that of the head having a better SER. Accordingly, the sensitivity of the defect detection does not decrease so much. Because of it, differently using the ECC 2 and the ECC 4 according to an SER of a head makes it possible to effectively achieve both ensured quality and yields.

The defect inspection in this embodiment is performed in the form of a read/write test in order to detect a read error by use of inspection data and an ECC used to correct the inspection data, in which the number of symbols is selected. When reading data on each recording surface, a head is first positioned at an outermost circumferential track, and then inspection data of each sector is read by use of the ECC 2 or the ECC 4. How to cope with the case where an error is detected will be described later. After completing read of inspection data from all sectors of one track, and error processing thereof, a seek is made to an adjacent track. Then, inspection data of all sectors is read in like manner according to steps up to a block 117. Such steps are repeated to read inspection data that is written to all sectors on one recording surface.

In a block 111, the time over is set as the time spent in the defect inspection, and then the time required for this defect inspection is measured. If the defect inspection time does not exceed the time over, the process proceeds to a block 115 where by use of an ECC, the number of symbols of which is set for a classified head, a determination is made as to whether or not an error has been detected when reading inspection data of each sector. The error detection is performed by a well-known logic element used for ECC, which is placed on a circuit board of the magnetic disk drive 10. The logic element determines whether or not, when reading read data written to a sector by use of an ECC, a bit string of inspection data can be identified as a correct bit string that uniquely exists.

If an error is not detected in the block 115, the process proceeds to a block 117, where a determination is made as to whether or not reading of all sectors provided on one recording surface of the magnetic disk is completed. In this embodiment, inspection data written to one sector is read six times (one write, six reads). In this case, it may also be so devised that inspection data is written once before reading the inspection data three times, and then inspection data is newly written once before reading the inspection data three more times (two writes, six reads).

If six times of reading inspection data are completed for all sectors in the block 117, the process proceeds to a block 119. In the block 119, the defect inspection of the head ends, and the defect inspection of its corresponding recording surface of the magnetic disk ends. Then, the process proceeds to a block 129. In the block 129, a determination is made as to whether or not the defect inspection of a magnetic disk has been completed for all of the heads 17*a*, 17*b*, 17*c* and 17*d* included in the magnetic disk drive 10. If the defect inspection has been completed, the process proceeds to a block 131 where the defect inspection of the magnetic disk drive 10 ends. In the block 129, if by use of another head it is necessary to perform the defect inspection of its corresponding recording surface, the process proceeds to the block 107, where by use of the another head, inspection data is written using the ECC 20, and then the defect inspection is continued according to similar steps.

Here, the inspection data may also be collectively written to recording surfaces 11*a*, 11*b*, 12*a*, 12*b* in advance by the heads 17*a*, 17*b*, 17*c*, 17*d* respectively in the block 107. In this case, if the defect inspection of all recording surfaces is not completed, the process proceeds from the block 129 to the block 109. In the block 115, if an error is detected in inspection data read from a certain sector, the process proceeds to a block 121 where the number of errors in this sector is counted. The counted number of errors is stored in a RAM or a ROM, which is provided on the circuit board 27 of the magnetic disk drive 10. Subsequently, in a block 123, a determination is made as to whether or not the number of times an error has been counted for the same sector is the specified number of times or more. In this embodiment, as a result of reading six times inspection data written to one sector, if an error is detected three times, it is determined that an error has been detected in this sector. This determination is based on rules of thumb that an error may sometimes be detected in the same sector once or twice due to an accidental factor, and accordingly such an error rarely leads to a serious defect of a disk.

In the block 123, if an error occurs three times or more as a result of reading inspection data from a certain sector, it is determined that an error has been detected in the sector in question. After that, the process proceeds to a block 125 where a sector address or a track address is selected. The selected address is then stored in a primary defect map (hereinafter referred to as PDM). The PDM is a table for storing a logical address of a defect sector detected in a manufacturing stage. Because users cannot use the sector stored in the PDM after shipment, it is possible to ensure the quality of a magnetic disk against a defect. As a recording medium that stores this primary defect map (PDM), the magnetic disks 11, 12, or the EEPROM provided on the circuit board 27 may be used.

In the block 125, if a sector is determined to be a defective sector in which an error has been detected, the sector is stored in the PDM. In addition to this case, even if a sector is not determined to be a defective sector in which an error has been detected, the sector may also be treated as a sector to be stored in the PDM in consideration of the address distribution of sectors that are determined to be defective sectors in which an error has been detected. For example, determining from a position of a sector that is determined to be a defective sector in which an error has been detected, if it can be estimated that a linear flaw occurs on a magnetic disk, it is determined that a sector positioned on a straight line of the linear flaw, which is not determined to be a defective sector, includes an undetectable flaw. Accordingly, such a sector is also stored in the PDM as a defective sector in the block 127. In another case, if errors are consecutively detected in sectors in the circumferential direction of a track, even if in the track there is a sector that is not determined to be a defective sector, an address of the track is stored in the PDM in a block 131. In the block 123, if the number of errors counted in the same sector is smaller than three times, the process proceeds to the block 109, and then reading of inspection data is continued.

In the block 111, if the inspection time exceeds the specified time, and consequently the inspection results in time over, the process proceeds to a block 133 where it is determined that the defect inspection has failed. Then, the inspection of the magnetic disk drive in question ends. The reason why the defect inspection requires a sufficient length of time is that while reading inspection data from each sector by use of the ECC 2 or the ECC 4, if an error is detected, the accumulated number of errors detected in the sector is counted in the block 121, which requires the time, and in this case the rotational delay of a magnetic disk is also required to read an adjacent sector. For example, if the number of errors detected in a certain track at the time of reading is 0, one rotation of a magnetic disk permits all sectors of the track to be read. However, if a read error is detected in 100 sectors, reading of all sectors in one track causes the track rotational delay 100 times. Accordingly, the length of time required for the defect inspection increases with the increase in the number of times an error is detected.

From the viewpoint of the ensured quality of a magnetic disk drive, so long as a defect in a sector is properly detected and stored, and so long as the nominal storage capacity is reserved, it can be said that there is no problem. However, the reason why inspection fail due to time over is set is as follows. The production process of magnetic disk drives, which is mass production, aims to ensure the constant quality of products, and to increase the quantity of production per unit time. In other words, the production process pursues both the quality and yields. Accordingly, the defect inspection is provided with a limit of time over. If the time spent in the defect inspection exceeds the specified length of time, the inspection is stopped in order to increase a non-defective unit obtaining rate per unit time with sacrificing the yields to some extent. Moreover, also with the object of reclaiming the cost invested in test equipment, it is also necessary to ensure the appropriate number of products that are inspected per unit time. A magnetic disk which is determined to be inspection fail is moved to another defect inspection process again by changing parameters and the recording density of a head; or the magnetic disk is subjected to disposal.

Figure 4:
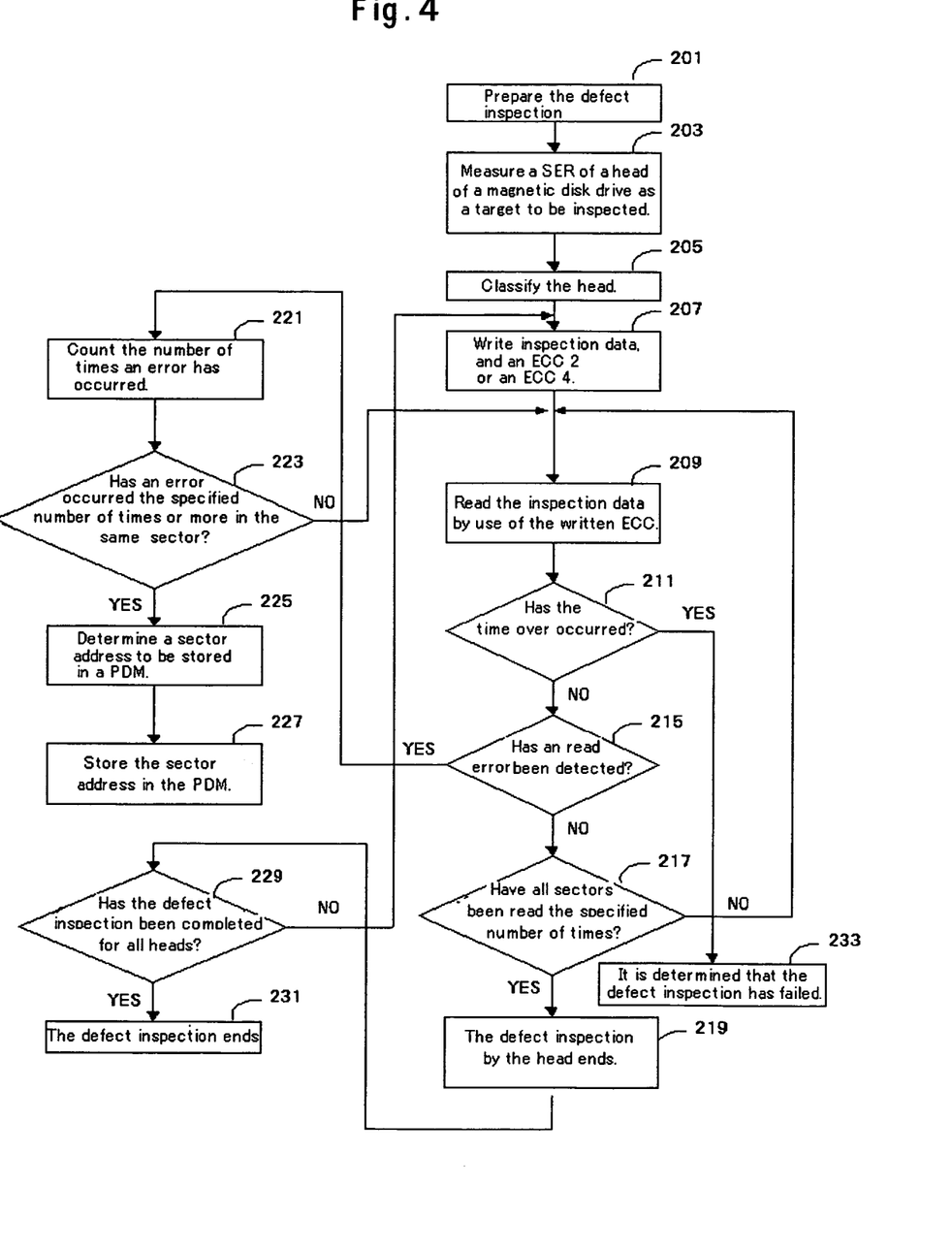
FIG. 4 is a flowchart illustrating another mode of the inspection method according to this embodiment.

Next, another defect inspection method according to this embodiment will be described with reference to FIG. 4. Because blocks in a flowchart shown in FIG. 4 are the same as corresponding blocks in the flowchart shown in FIG. 3 except the blocks 207 and 209, the description thereof will be omitted. In a block 207, a recording surface to be inspected first is selected. Next, if among the heads 17*a*, 17*b*, 17*c* and 17*d* a head corresponding to a recording surface to be inspected is classified as the first group, by use of this head, inspection data configured with an inspection bit pattern is written to the whole sector 35 of a corresponding recording surface of the magnetic disk 11 or 12. Then, the ECC 2, which means redundant bits used to correct the inspection data, is written to the ECC area 36. In addition, if among the heads 17*a*, 17*b*, 17*c* and 17*d* a head corresponding to a recording surface to be inspected is classified as the second group, by use of this head, inspection data configured with an inspection bit pattern is written to the whole sector 35 of the corresponding recording surface of the magnetic disk 11 or 12. Then, the ECC 4, which means redundant bits used to correct the inspection data, is written to the ECC area 36.

Next, in the block 209, inspection data is read by use of the ECC 2 or the ECC 4, which has been used when writing the inspection data, by the head to be inspected. The point of difference of the blocks 207 and 209 from the blocks 107 and 109 is that if inspection data is written by a head having a superior SER, the ECC 2 is added, whereas if inspection data is written by a head having an inferior SER, the ECC 4 is added, and then the added ECC 2 or the added ECC 4 is used at the time of reading. However, from the viewpoint of selecting the redundancy of ECC in response to the read performance of a head, this method produces similar effects according to the present invention.

The defect inspection described above can be achieved by storing beforehand a program for executing the steps illustrated in FIG. 3 or 4 in the magnetic disk drive, and then by instructing the MPU of the magnetic disk drive to execute the program. How to achieve the defect inspection is not limited to this method. The defect inspection may also be achieved by connecting dedicated test equipment to the interface connector 29 of the magnetic disk drive 10 to control the operation of the magnetic disk drive from outside so that the above-mentioned steps are executed. With the object of evaluating the effects of the inspection method in this embodiment, comparative experiments are performed for 100 magnetic disk drives as below. Each of the magnetic disk drives used for the comparative experiments has two magnetic disks, and the total storage capacity of each magnetic disk drive is 80 GB. Accordingly, one magnetic disk drive is provided with four heads, and the total number of heads used for the comparative experiments is 400.

In the comparative experiments, inspection data is read for the defect inspection by use of the ECC 2 or the ECC 4 in response to the performance of a read head. In the magnetic disk drive to be compared with this, all heads adopt the ECC 4. A threshold value of the SER used to classify the performance of a read head into the first group and the second group is set at −6.8. Here, the way of thinking of how to determine the threshold value of the SER will be described. Because the ECC 4 is conventionally used to perform the defect inspection, a possibility of improving the defect detectivity is examined first by using the ECC 2 that is a half of the ECC 4. Because the defect inspection can be completed before the time over even by use of the ECC2, the required extent of the SER is examined. The defect inspection is first performed for all heads of 100 magnetic disk drives by use of the ECC 2, and then magnetic disk drives in which the time over has occurred are selected.

Next, the defect inspection is performed for the selected magnetic disk drives by use of the ECC 4, and then a SER of each head, the defect inspection of which could be completed without the time over, is checked. For each individual magnetic disk drive, a check is made as to whether or not the time over is caused by an improper SER. What is checked next is a SER of each head in which although the defect inspection using the ECC 4 succeeds, the defect inspection using the ECC 2 fails purely due to an improper SER. Then, a threshold value of the SER is set.

The result of the comparative experiments will be shown in a table 1 described below. In the table 1, a column of (1) ECC mix shows the number of times it is determined that an error has been detected, and the length of time spent in the defect inspection, which are obtained when adopting the defect inspection method according to this embodiment that uses both the ECC 2 and the ECC 4; and a column of (2) ECC 4 shows the similar result obtained when performing the defect inspection using only the ECC 4. In addition, a column of (3) delta shows a delta value obtained by subtracting a value of (2) from a value of (1); and a column of (3)/(2) shows a percentage obtained by dividing a value of (3) by a value of (2).

TABLE 1

|  | (1) ECC mix | (2) ECC4 | (3) delta | (3)/(2) |
|---|---|---|---|---|
| The length of test time (hours) | 9.80 | 9.69 | 0.11 | 1.14% |
| The number of times of detected error | 10424 | 9866 | 558 | 5.66% |

As shown in the table 1, because the length of test time is 9.80 hours for ECC mix and 9.69 hours for ECC 4, a mean value of delta values of the length of test time is 0.11 hours. This mean value is equivalent to 1.14% of a mean value of absolute values of the read time in the defect inspection using the ECC 4. Even if the length of test time is extended to such an extent, little influence is exerted upon the occurrence of a defective unit caused by the time over in the whole inspection process. Actually, no substantial difference in yields is found between both methods. Incidentally, in the defect inspection by ECC mix, among 400 heads used in this experiment, two-symbol ECC is applied to 56% of the heads, whereas four-symbol ECC is applied to 44% of the heads.

In addition, as for the number of times it is determined that an error has been detected, on an average an error has been detected many times in the defect inspection by ECC mix. The delta value of the number of times it is determined that an error has been detected is 5.66% of a mean value of absolute values of the actual number of times it is determined that an error has been detected. To be more specific, while the length of test time increases only by 1.14%, the number of times it is determined that an error has been detected is improved by 5.66%. Therefore, it could be confirmed that the defect inspection by ECC mix detects many defects without exerting a bad influence upon yields. Incidentally, if the number of sectors to be stored as defective sectors increases as a result of detecting many defects, there arise concerns about failing in satisfying the nominal storage capacity. However, it could also be confirmed that the allowable storage capacity is large enough to store the considerable number of defective sectors, which produces no problem on this point. Therefore, it could be confirmed that the requests of yields and the quality, which conflict with each other, can be satisfied in a well-balanced manner.

Although the ECC 4 and the ECC 2 are used in this embodiment, the scope of the present invention is not limited to this case. The scope of the present invention includes using the other number of symbols differently in response to the read performance of a head. Moreover, the SER which was adopted as a read parameter of a head is merely an example. The scope of the present invention, therefore, is not limited to this case, and an arbitrary indicator for evaluating the read performance of a head can be adopted. Read parameters of a head may include parameters relating to the performance of a head unit; and parameters relating to the overall performance including a mechanical operation mechanism of a slider on which a head is formed, and a state of electrical wiring that connects to a head and a read/write channel.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. An inspection method for inspecting a defect of a magnetic disk in a magnetic disk drive comprising the magnetic disk and a head, said inspection method comprising:

classifying the head as either a first group of heads having superior read performance or a second group of heads having read performance inferior to the read performance of the head in the first group;

associating a head classified as the first group with a first error correction code having a first number of symbols, and associating a head classified as the second group with a second error correction code having a second number of symbols that is larger than the first number of symbols;

writing to the magnetic disk, by the head, inspection data, and a third error correction code used to correct an error of the inspection data, said third error correction code having a specified number of symbols that is larger than the second number of symbols;

if the head is classified as the first group, reading the inspection data by use of the first number of symbols that is part of the specified number of symbols of the third error correction code; and detecting a read error of the inspection data.

2. The inspection method according to claim 1, wherein reading the inspection data comprises reading the inspection data by use of the second number of symbols that is part of the specified number of symbols of the third error correction code when the head is classified as the second group.

3. The inspection method according to claim 1, wherein classifying the head includes measuring a soft error rate of the head.

4. The inspection method according to claim 1, wherein said specified number of symbols is the number of symbols applied when users use the magnetic disk drive.

5. The inspection method according to claim 4, wherein said first number of symbols is 2, and said second number of symbols is 4.

6. The inspection method according to claim 1, wherein said third error correction code is added to the inspection data to be written, before the inspection data is written to a sector of the magnetic disk.

7. The inspection method according to claim 1, wherein detecting a read error includes at least storing, in a primary defect map, a sector in which an error has been detected.

8. The inspection method according to claim 7, wherein storing a defective sector in the primary defect map includes selecting, on the basis of the sector in which the error has been detected, a sector in which an error has not been detected, and then storing the selected sector in the primary defect map.

9. The inspection method according to claim 1,
wherein said magnetic disk drive comprises a head classified as the first group and a head classified as the second group.

10. The inspection method according to claim 1, further comprising:
if reading the inspection data and detecting a read error of the inspection data do not end within a given period of time, entering a state of inspection fail.

* * * * *